Patented July 2, 1940

2,206,483

UNITED STATES PATENT OFFICE 2,206,483

MANUFACTURE OF PASTEURIZED POTATO SALAD

Ellis R. Meaker, Auburn, N. Y., assignor to Ivanhoe Foods Inc., Auburn, N. Y., a corporation of New York No Drawing. Application May 29, 1936, Serial No. 82,671

4 Claims. (Cl. 99—186)

This invention relates to the canning of pasteurized potato salad and the method of making the same. Incidental to both the above method and product the invention includes the manufacture of a salad dressing capable of being pasteurized without impairing its homogeneity.

Potato salad in the contemplation of the present invention consists essentially of potatoes in mixture with a dressing which is an emulsion of water and oil with other ingredients.

Previous attempts to can potato salad have failed because it has been necessary to sterilize the product, and at the required high temperature the oil of the dressing separates from the emulsion impairing the quality of the dressing both from the standpoint of appearance as well as taste.

The object of this invention is two-fold: 1, to compound a salad dressing in which the oil will not separate out of the emulsion at the temperature of pasteurization and 2, so to pre-treat the potatoes that the sterilization of the sealed container can be accomplished at a temperature considerably below the temperature heretofore found necessary.

Referring now to a description of the detailed process and product constituting the present invention, I have discovered that by emulsifying the oil with a starch solution having about the same thickness or viscosity as that of the oil, separation of the oil from the starch solution at high temperature does not occur, and I have also found that if the potatoes are pre-treated in a vinegar pickle, the sealed container can be sterilized at a lower temperature than the boiling point of water thereby further safe-guarding the integrity of the dressing.

Specifically, in making the potato salad of the present invention, I employ the following ingredients substantially in proportionate quantities as stated:

*Ingredients*

| Materials | Amounts |
|---|---|
| Egg yolk | 8.333 lbs. (8.6 oz.). |
| Oil, vegetable | 25 lbs. (3¼ gal.). |
| Mustard | 2 lbs. |
| Pepper | .232 lbs. (3¾ oz.). |
| Salt | 5 lbs. |
| Sugar | 18.333 lbs. |
| Tapioca | 5 lbs. |
| Vinegar | 6 pts. |
| Water | 26 lbs. |
| Potatoes | 315 lbs. |
| Pickled onions | 2.75 lbs. |
| Pimentos | 8.5 lbs. |

I first put the egg yolk, mustard, pepper and a proportion of the sugar, say for example, 3 lbs. 6 oz. in a beating tub and add the vegetable oil slowly while agitating the mixture. Agitation is continued for a period of 15 minutes or more.

In making the starch solution I first suspend the entire quantity of starch in one gallon of water and then after straining through an 80-mesh sieve, I mix together the starch suspension and the entire remaining quantity of water together with the vinegar, salt and the remainder of the sugar in a steam ketttle and cook with constant stirring until the resulting liquid is barely thick. The mixture is cooled for forty minutes, preferably in the steam kettle and with constant stirring. After it has cooled to approximately 140° F. it is thrown together wtih the egg-oil mixture and beat for from one to several minutes. When oil is added to water and agitated an emulsion is formed which is very unstable at high temperatures, the oil capsules coalescing and sepparating from the water. This is probably due to the fact that there is a great difference in density between the oil and the water so that the water particles are not able to maintain their individual positions in the interstices between the oil globules. By making a starch solution the density or thickness of the water is built up until it approximates that of the oil making an emulsion much more stable so that the oil will not separate out at a temperature approximating the boiling point of water. I have found that the same result cannot be obtained by simply mixing oil, water and starch and treating them as a simultaneous mixture but that it is obsolutely essential that the starch be dissolved in the water before the vegetable oil is added.

The foregoing quantity of dressing is sufficient to treat a little more than 300 lbs. of potatoes.

In continuing the process for the production of potato salad, the potatoes are peeled, eyed and diced and then covered with a dilute vinegar pickle, made, for example, by diluting 6¾ pints of 100 gr. vinegar with 180 lbs. of water. This quantity of pickle is sufficient to cover approximately 300 lbs. of potatoes. The potatoes are kept in pickle for a period of about 16 hours, and then cooked until done. The potatoes together with the pickled onions and pimentos are mixed with the salad dressing, filled into cans, sealed, preferably under vacuum, and processed at 190° F. The period of processing will vary with the size of the container, 45 minutes being about right for 1-lb. cans while approximately 5 hours is required for a No. 10 container.

After the processing period has been completed the cans are cooled in the usual manner.

I have found that ordinarily potatoes are very difficult to sterilize, requiring a temperature of at least 212° F. over a long period of time. The pickling as above described, materially reduces the required sterilizing temperature so that in no instance is it necessary to subject the salad dressing to a temperature as high as the boiling point of the aqueous ingredient. The salad dressing is thus further assured from the breaking down of the emulsion by the separation of the oil from the water.

It will be understood from the above examples that certain of the ingredients, such as the mustard, pepper, salt, pickled onions and pimentos are not essential either to the process or the product eventuating therefrom but are incorporated in the interest of the flavor of the product, that they may be varied in quantity as desired and that they may be substituted by other flavoring ingredients without departing from the spirit and scope of the invention. It is, of course, obvious to those skilled in the art that the sequence of processing steps is inconsequential excepting to the extent indicated, namely, that it is necessary first, to form an aqueous solution of starch before emulsifying it with the vegetable oil and secondly, that the pre-pickling of the potatoes is necessary in order that the sterilization may be successfully accomplished at a temperature below 212° F.

What I claim as my invention is:

1. Process of making pasteurized potato salad comprising heating in sealed containers at about 190° F. but below the boiling point of water a mixture comprising cooked potatoes containing vinegar and an emulsion of egg yolk, vegetable oil and a cooked aqueous solution of starch.

2. Process of making pasteurized potato salad comprising bringing vegetable oil into emulsion with a cooked aqueous solution of starch having a consistency aproaching that of the oil, mixing said emulsion with vinegar pickled and cooked potato pieces, and processing this final mixture in containers at a temperature of approximately 190° F., but below the boiling point of water.

3. Process of making pasteurized potato salad comprising bringing vegetable oil into emulsion with a cooked aqueous solution of starch whereby to prevent separation of the components of the emulsion upon the subsequent processing, mixing said emulsion with vinegar pickled and cooked potato pieces, and processing this final mixture in containers at a temperature of approximately 190° F., but below the boiling point of water.

4. Process of making pasteurized potato salad comprising bringing egg yolk, vegetable oil and a cooked aqueous solution of starch into an emulsion characterized in that it is stable during subsequent processing, mixing said emulsion with vinegar pickled and cooked potato pieces, and processing this final mixture in sealed containers at a temperature of approximately 190° F., but below the boiling point of water.

ELLIS R. MEAKER.

DISCLAIMER 2,206,483.—*Ellis R. Meaker*, Auburn, N. Y. MANUFACTURE OF PASTEURIZED POTATO SALAD. Patent dated July 2, 1940. Disclaimer filed March 17, 1944, by the inventor; the assignee, *Ivanhoe Foods Inc.*, consenting.

Hereby enters this disclaimer to claims 1, 2, 3, and 4 of said patent.

[*Official Gazette April 18, 1944.*]